United States Patent [19]

Kelly, Jr.

[11] Patent Number: 4,753,304

[45] Date of Patent: Jun. 28, 1988

[54] VOLUME AND PRESSURE BALANCED RIGID FACE SEAL FOR ROCK BITS

[75] Inventor: Joseph L. Kelly, Jr., Houston, Tex.

[73] Assignee: Hughes Tool Company, Houston, Tex.

[21] Appl. No.: 23,178

[22] Filed: Mar. 9, 1987

[51] Int. Cl.⁴ ............................................. E21B 10/24
[52] U.S. Cl. ....................................... 175/371; 277/92
[58] Field of Search .................. 175/227, 371, 372; 277/92

[56] References Cited

U.S. PATENT DOCUMENTS

| | | | |
|---|---|---|---|
| 3,761,145 | 9/1973 | Schumacher, Jr. | 175/371 X |
| 4,172,502 | 10/1979 | van Nederveer | 175/372 X |
| 4,306,727 | 12/1981 | Deane et al. | 175/371 X |
| 4,466,622 | 8/1984 | Deane et al. | 175/371 X |
| 4,516,640 | 5/1985 | Karlsson | 175/371 X |
| 4,598,778 | 7/1986 | Highsmith | 175/371 |
| 4,610,319 | 9/1986 | Kalsi | 175/371 |
| 4,623,028 | 11/1986 | Murdoch et al. | 175/371 |
| 4,629,338 | 12/1986 | Ippolito | 175/371 X |
| 4,666,000 | 5/1987 | Evans | 175/371 X |
| 4,666,001 | 5/1987 | Burr | 175/371 |

Primary Examiner—Stephen J. Novosad
Assistant Examiner—William P. Neuder
Attorney, Agent, or Firm—Robert A. Felsman

[57] ABSTRACT

An earth boring bit having a rotatable cutter secured to a lubricated, cantilevered bearing shaft, sealed with an improved pressure compensating rigid face seal assembly. The assembly has a rigid ring with a radial face that opposes and engages a radial face integral with a cutter seal groove. A resilient energizer ring is compressed between opposed conical surfaces, one on the rigid ring and the other in a shaft seal groove, to force the radial faces together. The periphery of the energizer ring is inside the journal bearing surface, which is ideally aligned with the mid-section of the ring, to define a essentially constant, lubricant filled, volume between the seal assembly and the shaft seal groove—even as the cutter and seal assembly move relatively to the shaft during drilling. As a result, pressure variations in the vicinity of the seal assembly are minimized.

4 Claims, 3 Drawing Sheets

VOLUME AND PRESSURE BALANCED RIGID FACE SEAL FOR ROCK BITS

CROSS REFERENCE TO RELATED APPLICATION

This application has disclosure in common with an application of Bruce H. Burr entitled "Earth Boring Bit with Two Piece Bearing and Rigid Face Seal Assembly", Ser. No. 023,170, filed Mar. 9, 1987.

BACKGROUND OF THE INVENTION

1. Field of the Invention

The field of this invention is earth boring bits—especially the seal and lubrication systems for rolling cutter rock bits.

2. Description of the Prior Art

Recently, metal face seals have been used successfully to seal lubricant within the rotatable cutters and around the cantilevered bearing shafts of a rock bit. U.S. Pat. No. 4,516,641, "Earth Boring Bit With Pressure Compensating Rigid Face Seal", May 14, 1985, includes background information leading to this milestone in the continuing search for seal improvement. The seal disclosed in U.S. Pat. No. 4,516,641 utilizes two rigid rings which are urged against one another by a pair of elastomeric rings confined in a seal groove between each cutter and its supporting bearing shaft. Since the axial seal assembly movement is greater than axial cutter movement, a groove geometry is provided to permit unrestricted seal assembly movement. As a result, pressure pulses in the lubricant around the seal and lubricant losses are minimized. The seal assembly becomes a supplemental pressure compensator that assists the primary compensator in each leg of the bit in maintaining a selected low pressure differential across the seal assembly.

An improvement to the structure disclosed in U.S. Pat. No. 4,516,641 is disclosed in U.S. Pat. No. 4,666,001, "Earth Boring Bit With Improved Rigid Face Seal Assembly", May 19, 1987. If the rigid rings are positioned in a groove inside the periphery of an associated journal bearing surface, axial seal movement may be decreased relative to axial cutter movement. In the preferred embodiment axial seal assembly movement is one half that of the cutter, which better balances the loads applied to each half of the seal assembly. Hence, prolonged life of the seal assembly may be expected.

Each of the seal assemblies disclosed in the above patents uses two opposed rigid rings and two resilient energizer rings in a groove configuration to achieve lubricant pressure equalization in the vicinity of the seal. It would be advantageous to achieve the results of these seal assemblies with fewer components in a reduced space. This would simplify manufacture, foreseeably reduce costs, and enable utilization in a wider variety of bit sizes and maybe even bit types.

SUMMARY OF THE INVENTION

It is the general object of the invention to provide a rock bit of the rotatable cutter type with an improved, rigid face seal assembly that minimizes pressure fluctuations in the lubricant in the vicinity of the assembly.

The above and additional objects of the invention are achieved by sealing a rotatable cutter to a lubricated, cantilevered journal bearing shaft with an improved pressure compensating, rigid face seal assembly. The assembly has a rigid ring with a radial face that opposes and engages an opposed radial face integral with a seal groove on the cutter. A resilient energizer ring is compressed between opposed, generally conical surfaces, one on the rigid ring and the other in a shaft seal groove to force the radial faces together. The mid-section of the energizer ring is positioned relative to the journal bearing surface and its inner periphery is inside the journal bearing surface to define an essentially constant, lubricant filled volume between the seal assembly and the shaft seal groove—even as the cutter and seal assembly move relative to the shaft during drilling. Pressure variations in the vicinity of the seal assembly are minimized by sizing the system components consistent with the following formula:

$$D_s = D_c$$

where:

$D_s$ = Mean Diameter of O-Ring,
$D_c$ = Rotatable Cutter Journal Diameter,

DESCRIPTION OF THE PREFERRED EMBODIMENT

Figure 1:
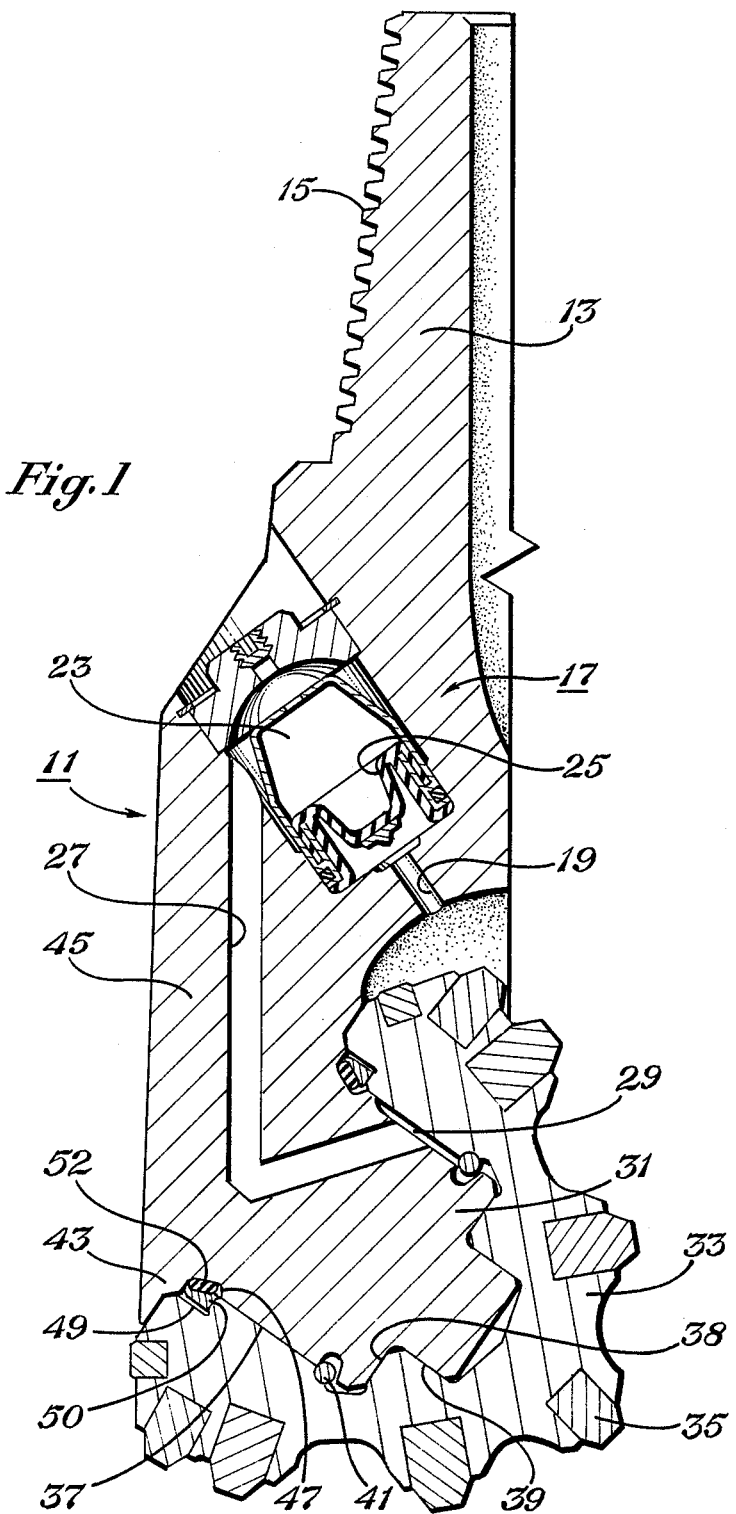
FIG. 1 is longitudinal section of a rock bit of the rotatable cutter type which includes a pressure compensated lubrication system and, between cutter and journal bearing, a seal assembly that embodies the principles of the invention.

In FIG. 1 the numeral 11 designates a rock bit having a head section 13 that is one of usually three that form a body which is threaded at 15. A lubricant pressure compensator system 17 is included in each head section 13, being vented at 19 to the exterior of the bit and the ambient drilling mud in a bore hole (not shown). Lubricant fills a reservoir 23, which is separated from the drilling mud by a flexible diaphragm 25. The diaphragm 25 is part of a hydrostatic pressure compensator that tends to equalize the pressure of the lubricant with that of the drilling mud and maintains this pressure in the lubricant in passage 27, as well as the space 29 and others between the bearing shaft 31 and rotatable cutter 33. For additional information about the lubrication system see U.S. Pat. No. 4,055,225, "Lubricant Pressure Compensator For a Rock Bit", Oct. 25, 1977. The bearing shaft 31 is cantilevered and extends inwardly and downwardly in supporting the cutter 33.

The cutter 33 has conventional teeth 35, here inserts of cemented tungsten carbide, and internal bearing surfaces that oppose those of the bearing shaft 31, including the journal bearing surface 37, thrust face 38 and pilot pin surface 39. The rotatable cutter 33 is secured to the bearing shaft 31 by a resilient snap ring 41. Additional information about the snap ring retainer system may be seen in U.S. Pat. No. 4,344,658, "Cone Snap Ring", Aug. 17, 1982. There are radial and axial clearances between the various components of the bearing and its retainer system, resulting in radial and axial play or movement of the cutter on the shaft during drilling. As a consequence, the cutter 33 acts as a pump as it moves on the bearing shaft 31 during drilling, creating volume changes accompanied by pressure pulses or fluctuations in the lubricant around the shaft.

The pressure pulses occur also in the seal area at the base 43 of the bearing shaft 31, where it joins the leg 45 of the head section 13. This invention minimizes the amplitude of these pulses.

As shown in FIG. 1, the base 43 of the bearing shaft 31 contains an annular shaft seal groove 47 that opposes an annular cutter seal groove 49. Confined within these two grooves is a rigid ring 50 and a resilient energizer ring 52, which together form the sealing system of this invention, as better seen in FIGS. 2 and 3.

Figure 2:
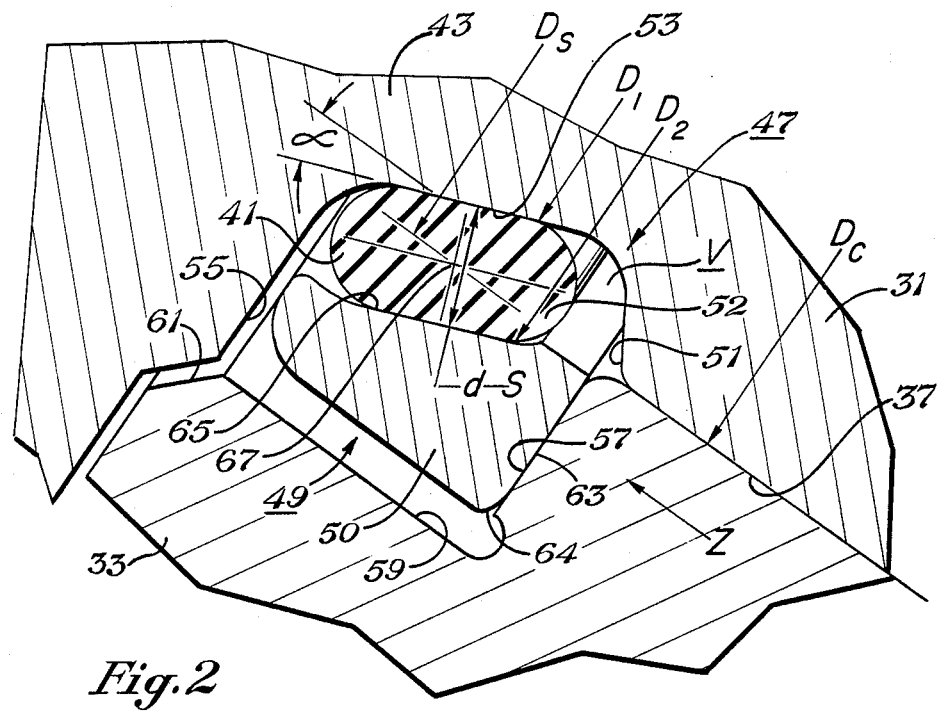
FIG. 2 is an enlarged and fragmentary longitudinal section which illustrates the seal assembly of FIG. 1, including the shaft groove, the cutter groove with its radial sealing face, the rigid ring with its opposed radial face, and a resilient energizer ring compressed between the rigid ring and shaft groove.
Figure 3:
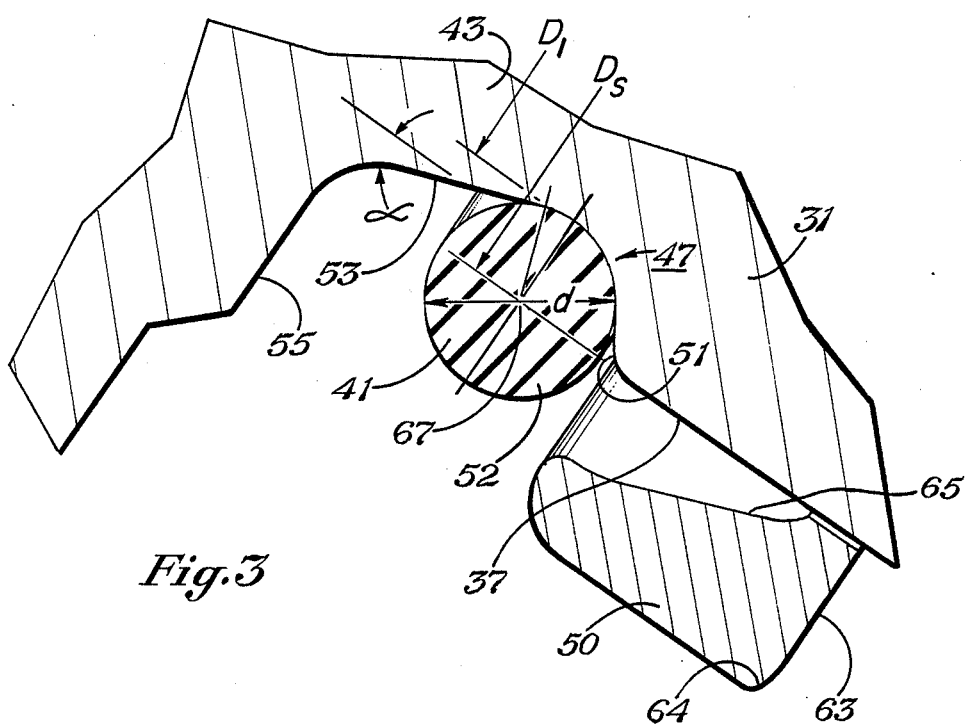
FIG. 3 is an enlarged, fragmentary section of the FIG. 1 embodiment, except the cutter has been removed and the rigid ring positioned prior to assembly over the energizer ring.

The shaft seal groove 47 in the base 43 of the bearing shaft 31 is radially inward of the cylindrical bearing surface 37 toward the axis of rotation (not shown) and has an inner endwall 51, an outwardly facing and circumferential conical surface 53 at an angle alpha with the journal bearing surface 37, and an outer endwall 55. The opposed cutter shaft seal groove 49 has an outwardly facing radial sealing face 57, integral with the cutter, and a circumferential surface 59 extending outwardly to the mouth 61 of the cutter. The rigid ring 50 has a sealing face 63 and a conical, inwardly facing and circumferential region 65 that is parallel with and opposed to the conical surface 53 of the shaft seal groove 47 at assembly. The resilient energizer ring 52 has its inner periphery inside the journal bearing surface 37 and is compressed between the conical surfaces 53, 65 of the shaft seal groove 47 and the rigid ring 50. As shown in FIGS. 2 and 3 its mid-section 67 is aligned with the cylindrical journal bearing surface 37.

A volume of lubricant V occupies the space bounded by seal groove 47, rotatable cutter 33, rigid ring 50, and energizer 52. As rock bit 11 drills, rotatable cutter 33 moves axially with respect to bearing shaft 31 in response to drilling forces. This motion, designated by the arrow Z in FIG. 2, affects volume V in two ways.

As rotatable cutter 33 moves a distance Z toward base 43 of bearing shaft 31, V decreases according to the relationship:

$$\Delta V_c = \frac{\pi}{4} (D_2^2 - D_c^2) \Delta Z \quad (1)$$

Where
$\Delta V_c$ = the decrease in V due to the cutter movement,
$D_2$ = the average smallest diameter at which energizer 52 contacts rigid ring 50 during cutter movement Z, and
$D_o$ = the rotatable cutter journal diameter.

Simultaneously, energizer 52 undergoes rolling compression, moving half the distance moved by rotatable cutter 33, normal to base 43. This action causes volume V to increase according to the relationship:

$$\Delta V_e = \frac{\pi}{4} \left[ 2D_s(d - s_1 - s_2)\cos\alpha - d(s_1 + s_2)\cos^2\alpha + \frac{3(s_1 + s_2)^2}{4} \cos^2\alpha \right] \Delta Z \quad (2)$$

Where
$\Delta V_e$ = the increase in V due to the energizer movement,
$D_s$ = the diameter of the energizer midsection,
$s_2$ = the maximum squeeze experienced by energizer 52 when rotatable cutter 33 moves toward base 43,
$s_1$ = the minimum squeeze experienced by energizer 52 when rotatable cutter 33 moves away from base 43,
d = the diameter of the O-ring cross section, and
$\alpha$ = the inclination of conical surfaces 53 and 65.

Because of the speed with which rotatable cutter movements occur and the small clearances between bearing shaft 31 and rotatable cutter 33, any change in volume V will be accompanied by a momentary pressure differential across the seal as lubricant seeks to enter or leave the space occupied by volume V. If such pressures are excessive, the seal will either leak or be damaged by excessive loads between sealing faces 57 and 63. Ideally, therefore, the assembly should be designed such that $$\Delta V_c = \Delta V_e \quad (3)$$

In FIGS. 2 and 3 $D_1$ designates the smallest diameter at which energizer 52 engages surface 53 after assembly of rotatable cutter 33 on bearing shaft 31. Because energizer 52 is compressed as it rolls against conical surface 53, diameter $D_1$ remains essentially constant so that $$D_2 = D_s + (d - s_2 - s_1) \cos \alpha \quad (4)$$

Using this value for $D_2$ in Equation 1 and substituting Equations 1 and 2 for $\Delta V_c$ and $\Delta V_e$ in Equation 3, one finds that the condition for volume and pressure balance is achieved when $D_s$, $D_c$, d, $s_1$, $s_2$ and $\alpha$ are selected such that $$D_s = \sqrt{D_c^2 - \left[ d - \left( \frac{s_1 + s_2}{2} \right) \right]^2 \cos^2\alpha} \quad (5)$$

For rock bit bearing seals, the second term under the radical sign in Equation 5 is very small compared to $D_c^2$ and can be neglected without significant error. Thus a very good engineering approximation for the volume and pressure balanced design is achieved simply by making $$D_s = D_c \quad (6)$$

For the harsh environment in which rock bits work, it is found that a suitable material for energizer ring 52 is a highly saturated nitrile (HSN) elastomer marketed by Parco under the compound designation 2281-80. With this material, adequate sealing forces can be maintained between faces 57 and 63 and good energizer life will be achieved if the maximum squeeze is limited to about 35 percent of the o-ring cross section diameter. It is also found that a suitable value for the inclination of conical surfaces 53 and 65 is 20°. For a 2-inch diameter bearing which is typical in 7⅞" diameter rock bits, a suitable cross section diameter for energizer 52 is 0.169 inch. A reasonable maximum allowance for axial cutter play is 0.030 inch which produces a squeeze variation of approximately 6 percent in a 0.169-inch O-ring cross section when $\alpha$ is 20°. The minimum squeeze for this application is therefore 29 percent and Equation 5 dictates a mean O-ring diameter of 1.997 inches which is very close to 2 inches as called for by Equation 6.

The dimensions of energizer 52 and allowable squeeze establish the depth and length of groove 47 and the length of conical surface 65. The minimum diameter of groove 47 is the same as the relaxed inner diameter of energizer 52, as shown in FIG. 3. The length of groove 47 and conical surface 65 are selected to accommodate the fully deformed energizer 52 with 35 percent squeeze, as shown in FIG. 2.

A suitable material for rigid ring 50 is 440C stainless steel. This material provides acceptable wear properties when hardened to approximately 50 Rockwell C. The mating rotatable cutter seal face should have comparable hardness and wear properties. Radial sealing faces 63 and 57 are lapped to a finish of about 1 or 2 $R_A$ and both are flat, except for a relieved portion on one. Such relief provides clearance for cross sectional rotation of ring 50 resulting from the force exerted by energizer 52 and ensures contact between the lapped surfaces of faces 63 and 57. In FIG. 2, the outermost portion 64 of face 63 is beveled to allow for counterclockwise cross sectional rotation of ring 50. If the centroid of the cross section of ring 50 is positioned to cause clockwise rotation, the innermost portion of face 63 would be relieved and portion 64 would be made flat. Conical surface 65 of ring 50 and conical surface 53 of groove 47 are provided with a surface finish of approximately 150 $R_A$ to discourage slippage relative to energizer 52.

Figure 4:
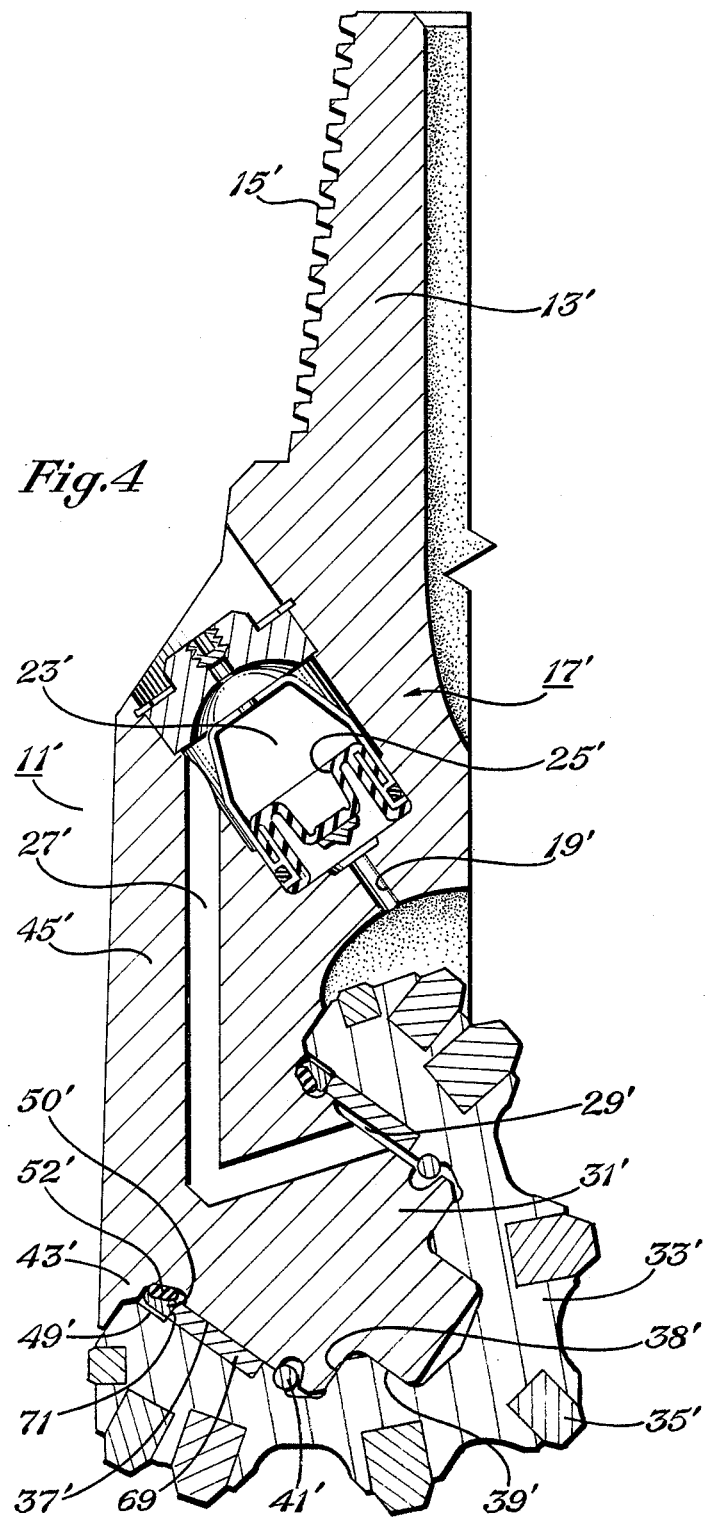
FIG. 4 is a longitudinal section of an alternate embodiment of the invention.

An alternate embodiment of the invention is shown in FIG. 4, which has components identical with those of FIG. 1 designated with numbers with identical digits but primed to distinguish them. The only difference in the structures is that a bearing insert 69 is retained by interference fit within a mating groove in the cutter 33'. The outer end 71 of the insert 69 forms a radial sealing face to oppose the sealing face 63' of the rigid ring 50'. The outer end 71 of the insert can be lapped when separate from the cutter 33'.

In operation the seal assembly and groove configuration define a volume V of lubricant that experiences minimum change as the cutter and seal assembly move during drilling. As a consequence, pressure changes in the lubricant adjacent the seal assembly are minimized. Enhanced seal life and effectiveness can thus be expected.

While the invention has been shown in only two of its forms, it should be apparent to those skilled in the art that it is not thus limited, but is susceptible to various changes and modifications without departing from the spirit thereof.

We claim:

1. An earth boring bit with an improved pressure compensating rigid face seal, said bit comprising:
   a body;
   a cantilevered bearing shaft having an axis of rotation, including a base secured to the body and a generally cylindrical journal bearing surface, extending obliquely inwardly and downwardly from the body;
   a cutter secured for rotation about the bearing shaft, with axial and radial play due to clearances;
   a lubrication system in the body, including a hydrostatic pressure compensator;
   a cutter seal groove partially formed by an outwardly facing radial seal face;
   a shaft seal groove formed in the base of the bearing shaft radially inward of the cylindrical journal bearing surface toward the axis of rotation and opposite the cutter seal groove, including a generally conical, circumferential surface;
   a rigid seal ring including a radial face opposing and sealingly engaging the radial seal face in the cutter seal groove, and a generally conical, circumferential surface opposing and spaced from the conical surface of the shaft seal groove;
   a resilient energizer ring compressed between the opposed conical surfaces of the rigid seal ring and shaft seal groove, with its inner periphery inside the journal bearing surface to define a volume remaining essentially constant as the cutter, rigid ring and energizer ring move during drilling.

2. An earth boring bit with an improved pressure compensating rigid face seal, said bit comprising:
   a body;
   a cantilevered bearing shaft having an axis of rotation, including a base secured to the body and a generally cylindrical journal bearing surface, extending obliquely inwardly and downwardly from the body;
   a cutter secured for rotation about the bearing shaft, with axial and radial play due to clearances;
   a bearing sleeve in the cutter and having an outwardly facing radial seal face;
   a lubrication system in the body, including a hydrostatic pressure compensator;
   a cutter seal groove formed in the mouth of the cutter, adjacent the radial seal face of the bearing sleeve;
   a shaft seal groove formed in the base of the bearing shaft radially inward of the cylindrical journal bearing surface toward the axis of rotation and opposite the cutter seal groove, including a generally conical, circumferential surface;
   a rigid seal ring with an inside diameter greater than that of the journal bearing, including a radial face opposing and sealingly engaging the radial face of the sleeve, and a generally conical, circumferential surface opposing and spaced from the conical surface of the shaft seal groove;
   a resilient energizer ring compressed between the opposed conical surfaces of the rigid seal ring and shaft seal grooves, with its inner periphery inside the journal bearing surface, to define a volume remaining essentially constant as the cutter, rigid ring and energizer ring move during drilling.

3. An earth boring bit with an improved pressure compensating rigid face seal, said bit comprising:
   a body;
   a cantilevered bearing shaft having an axis of rotation, including a base secured to the body and a generally cylindrical journal bearing surface, extending obliquely inwardly and downwardly from the body;
   a cutter secured for rotation about the bearing shaft, with axial and radial play due to clearances;
   a lubrication system in the body, including a hydrostatic pressure compensator;

a cutter seal groove partially formed by an outwardly facing radial seal face;

a shaft seal groove formed in the base of the bearing shaft radially inward of the cylindrical journal bearing surface toward the axis of rotation and opposite the cutter seal groove, including a generally conical, circumferential surface and an inner endwall, extending outwardly to the journal bearing surface, and an outer endwall;

a rigid seal ring with an inside diameter greater than that of the journal bearing, including a radial face opposing and sealingly engaging the radial face in the cutter groove, and a generally conical, circumferential surface opposing and spaced from the conical surface of the shaft seal groove;

a resilient, o-ring shaped energizer ring compressed between the opposed conical surfaces of the rigid seal ring and shaft seal grooves, with its mid-section aligned with the cylindrical journal bearing surface and spaced from the inner endwall of the shaft cutter seal groove to define a volume remaining essentially constant as the cutter, rigid ring and energizer ring move during drilling.

4. An earth boring bit with an improved pressure compensating rigid face seal, said bit comprising:

a body;

a cantilevered bearing shaft having an axis of rotation, including a base secured to the body and a generally cylindrical journal bearing surface, extending obliquely inwardly and downwardly from the body;

a cutter secured for rotation about the bearing shaft, with axial and radial play due to clearances;

a bearing sleeve retained by interference fit in the cutter and having an outwardly facing, radial seal face;

a lubrication system in the body, including a hydrostatic pressure compensator;

a cutter seal groove formed in the mouth of the cutter, adjacent the radial seal face of the bearing sleeve;

a shaft seal groove formed in the base of the bearing shaft radially inward of the cylindrical journal bearing surface toward the axis of rotation and opposite the cutter seal groove, including a generally conical, circumferential surface and an inner endwall extending outwardly to the journal bearing surface, and an outer endwall;

a rigid seal ring with an inside diameter greater than that of the journal bearing, including a radial face opposing and sealingly engaging the radial face of the sleeve, and a generally conical, circumferential surface opposing and spaced from the conical surface of the shaft seal groove;

a resilient, o-ring shaped energizer ring compressed between the opposed conical surfaces of the rigid seal ring and shaft seal grooves, with its mid-section aligned with the journal bearing surface, to define a volume remaining essentially constant as the cutter, rigid ring and energizer ring move during drilling.

* * * * *

UNITED STATES PATENT AND TRADEMARK OFFICE
CERTIFICATE OF CORRECTION

PATENT NO.  : 4,753,304

DATED       : June 28, 1988

INVENTOR(S) : JOSEPH L. KELLY, JR.

It is certified that error appears in the above-identified patent and that said Letters Patent is hereby corrected as shown below:

Column 3, Line 66:     "$D_o$" to -- $D_c$ --.

Signed and Sealed this

Twenty-fourth Day of January, 1989

*Attest:*

DONALD J. QUIGG

*Attesting Officer*    *Commissioner of Patents and Trademarks*

UNITED STATES PATENT AND TRADEMARK OFFICE
CERTIFICATE OF CORRECTION

PATENT NO.  : 4,753,304
DATED       : June 28, 1988
INVENTOR(S) : JOSEPH L. KELLY, JR.

It is certified that error appears in the above-identified patent and that said Letters Patent is hereby corrected as shown below:

Column 6, line 53:    "Grooves" to -- Groove --.

Column 7, line 18:    "Grooves" to -- Groove --.

Column 8, line 26:    "Grooves" to -- Groove --.

Signed and Sealed this

Thirtieth Day of May, 1989

Attest:

DONALD J. QUIGG

*Attesting Officer*　　　　*Commissioner of Patents and Trademarks*